June 16, 1969    W. J. WOSTL ET AL    3,448,616
LIQUID LEVEL DETECTOR
Filed June 29, 1967

INVENTORS.
WOLFGANG J. WOSTL
JOSEPH A. HEINTZ

BY McLean, Morton & Boustead
ATTORNEYS.

ated June 10, 1969

United States Patent Office 3,448,616
Patented June 10, 1969

3,448,616
LIQUID LEVEL DETECTOR
Wolfgang J. Wostl, South Holland, and Joseph A. Heintz, Calumet City, Ill., assignors to Sinclair Research, Inc., New York, N.Y., a corporation of Delaware
Filed June 29, 1967, Ser. No. 649,885
Int. Cl. G01f 23/00
U.S. Cl. 73—293         5 Claims

ABSTRACT OF THE DISCLOSURE

An adjustable liquid level detector, with an elongated frustoconical glass rod having a totally reflective smaller end which is exposed to the liquid, is provided in combination with a light source means for transmitting light through the rod towards the smaller reflective end and means for detecting variations in the amount of light reflected back towards the light transmitting means.

---

Figure 2:
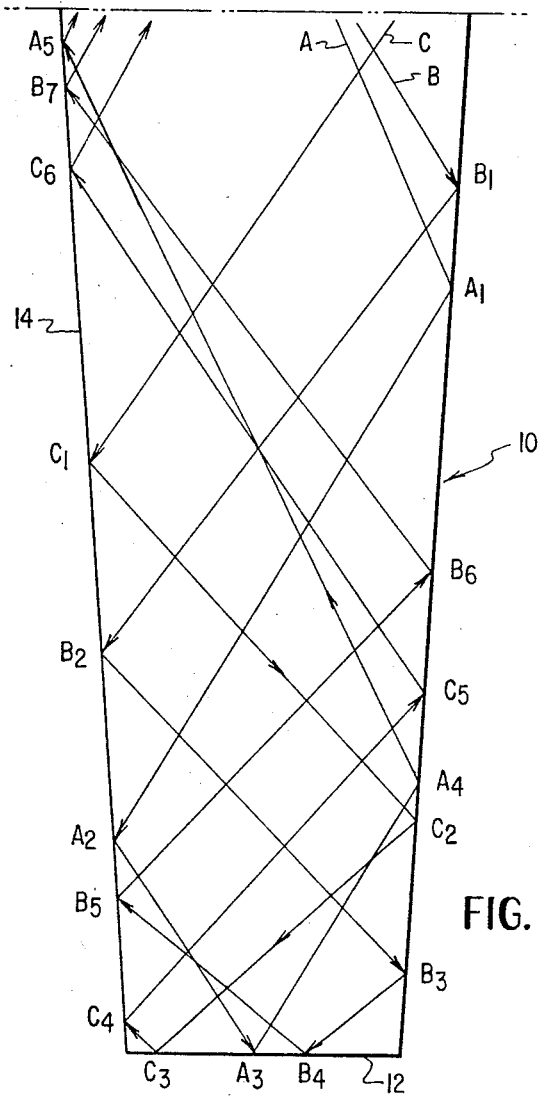

This invention provides an adjustable liquid level controller which is simple, reliable, has no moving parts, is economical and is generally not susceptible to chemical reactions or contamination of the fluid to be sensed. In general, the controller of this invention utilizes a rod of transparent material having a tapered control area, the smaller end of which is provided with a reflective surface, which is adapted to be exposed to the fluid to be sensed at a point intermediate its ends, in combination with means for transmitting light longitudinally through the rod in the direction toward the reflective surface and for determining variations in the amount of light transmitted through the rod and reflected back toward the light source.

It is well known that a rod of transparent material having an index of refraction of substantial magnitude will ordinarily transmit a substantial amount of light from one end to the other, even though the rod may be bent. The reason for this is that light seeking to escape through the lateral surface of the rod is totally reflected back into the rod unless the angle of incidence of the light at the surface of the rod is relatively small. The angle of incidence above which all light is totally reflected, is known as the critical angle and varies with the index of refraction of the rod construction material and the material in contact with the rod. For ordinary glass in air, it is in the neighborhood of 40°. Therefore, when a rod of glass is positioned in air or other gas and light is directed into one end of the rod, most of the light entering the rod will follow it to the opposite end and there emerge because most of the light will enter the rod at an angle less than 40° to the lateral surface of the rod, and will be totally reflected at a low angle from different points on the lateral surface of the rod until it reaches the opposite end. However, if a portion of the rod intermediate the end is immersed in a liquid having an index of refraction of the same order of magnitude as the rod material, or larger, then the rod substantially completely loses its internal reflecting properties, permitting much of the light to escape from the rod into the liquid, thereby greatly reducing the total amount of light transmitted to the remote end of the rod and substantially reducing the intensity of the transmitted light at the remote end.

U.S. Patent 2,190,027 to Jordan illustrates a liquid detecting device wherein a cylindrical rod is exposed to the fluid to be sensed and light is transmitted through the rod. The diminution in the intensity of illumination at the remote end of the rod is observed to provide for detection of the presence of liquid. The application of the device of Jordan to liquid level control is, however, very limited since the device determines only the presence of liquid at a particular location and does not provide knowledge of the actual level of the liquid which can be substantially higher than the rod. The present invention provides for an adjustable control point and is adaptable for use with a large number of fluids in addition to providing a continuous determination of the liquid level as the level rises or falls.

Figure 1:
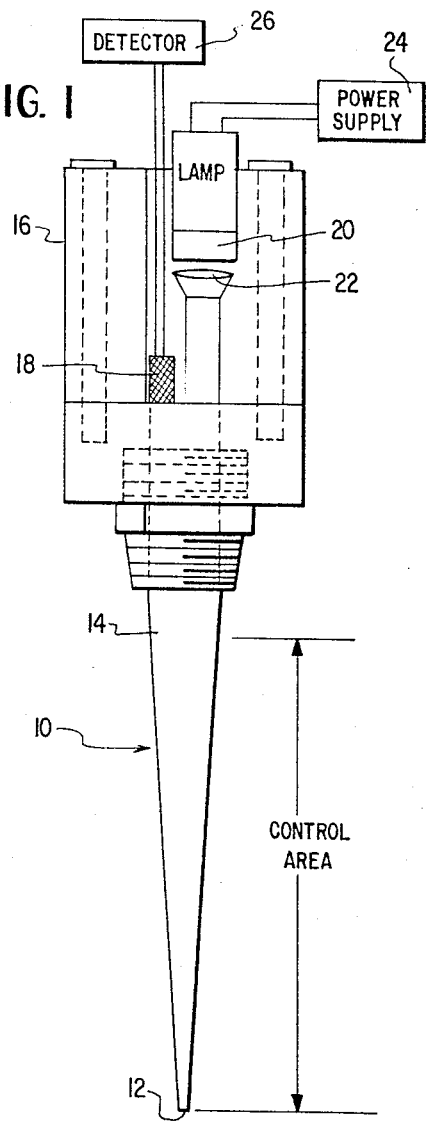
Figure 3:
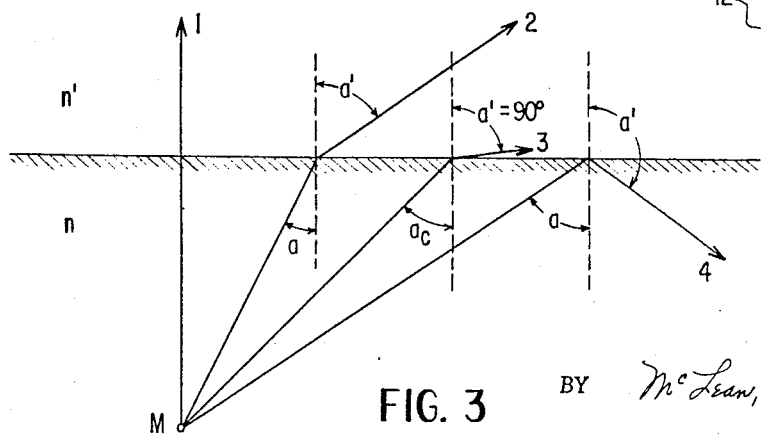

A full understanding of this invention and some specific applications thereof may be had from the following detailed description with reference to the accompanying drawing in which:

FIGURE 1 is a side view of a liquid level controller in accordance with this invention, and FIGURES 2 and 3 illustrate the principles underlying this invention.

Referring to FIGURE 3, the principles of this invention are illustrated by four monocromatic rays 1, 2, 3 and 4 shown diverging from a common point M in a medium of refractive index $n$ and striking the surface of a second medium of refractive index $n'$ where $n > n'$. From Snell's law $\sin(a)'$ is equal to $n/n' \sin(a)$, where $a$ is the angle of incidence and $a'$ is the angle of refraction. Since $n/n'$ is greater than unity, $\sin(a)'$ is larger than $\sin(a)$ and equals unity ($a'=90°$) for some angle ($a$) less than 90°. This is illustrated by ray 3 which emerges just grazing the surface at an angle of refraction of 90°. The angle of incidence for which the refracted ray emerges tangent to the surface is called the critical angle and is designated by $a_c$ in the above diagram. If the angle of incidence is greater than the critical angle, the sine of the angle of refraction, as computed by Snell's law, is greater than unity. This may be interpreted to mean that for $a > a_c$, the ray does not pass into the next medium but is totally internally reflected at the boundary surface. Total internal reflection, accordingly, can occur only when a ray is incident on the surface of a medium whose index is smaller than that of the medium in which the ray is traveling.

Applying the above principles to a glass rod emersed in a gas and taking 1.50 as a typical refractive index (RI) of glass, the critical angle $a_c$ of a glass-gas surface is 42° since $\sin a_c$ equals $1/1.50$ or 0.67. This means that light rays originating in a glass rod of uniform diameter and striking the glass-gas boundary at angles larger than 42° will not leave the rod but will travel along the length of the rod while being subjected to continuous total internal reflection until they strike the end of the rod. As long as the rod diameter is constant, totally internally reflected rays will always strike the glass-gas boundary at the same angles of incidence. If, however, the rod diameter changes uniformly as shown in FIGURE 2, the angle of incidence for the reflected ray will vary along the length of the rod, i.e. decrease as the ray travels towards the end of the rod having the smaller diameter. Once a ray has been internally reflected in the tapered rod it can continue to do so and eventually reverse its directional trend at the end of the rod to travel toward the part of the rod having the larger diameter. However, if, as the angle of incidence decreases, a point is reached where $a < a_c$, the ray will escape from the rod and the total light transmitted through the rod will be diminished.

FIGURE 2 shows three light rays A, B and C striking the glass-gas interface at various points on tapered rod 10 which has an internally reflective surface 12 at the small end. Each of rays A, B and C is passed into rod 10 so as to strike the boundary at an angle $a$, i.e. angle of incidence larger than the critical angle for the glass-gas interface. Even though the angles of incidence for rays A, B and C decrease as the rays travel toward the end of the rod having the smaller diameter, these angles as shown are always larger than $a_c$ for that interface. The internally reflective surface 12 on the end of rod 10 having the smaller diameter provides a mirror-like surface so that rays striking that surface will not leave the rod, no matter what angles at which they strike the boundary. If, however, any part of the control area, i.e. tapered portion of rod 10 is in contact with a liquid, a certain amount of the rays, e.g. rays A, B or C, that strike the glass-liquid interface will leave the rod due to the large difference in critical angles between a glass-gas interface and a glass-liquid interface. As shown above, for a typical glass-gas surface (RI of glass=1.50) $a_c$ is equal to about 42°. However, for a glass-water interface $a_c$ is equal to about 62°, for a glass-acetone interface $a_c$ is equal to 65°, and for a glass-carbon tetrachloride interface $a_c$ is equal to about 75°. A ray striking the boundary at a 45° angle of incidence, for example, will be internally reflected within rod 10 at a glass-gas interface (45°>$a_c$=42°) but will escape rod 10 as a glass-liquid, e.g. water interface (45°<$a_c$=62°). Accordingly, a liquid such as water just in contact with surface 12 at the end of rod 10 will not cause any rays to leave rod 10. However, as a liquid rises along rod 10, a varying amount of light rays will leave rod 10 depending upon the level of the liquid. In FIGURE 2, for example, ray C will leave first at point $C_4$ because at this point the angle of incidence shown is about 45° (45°<$a_c$=62°). As the liquid level rises to touch point $B_3$, ray B will leave since at this point $a$=42.5°<62°=$a_c$. A further rise in liquid level causes ray A to leave at point $A_2$ where $a$ is about 56°<62°=$a_c$. In practice the tapered rod surface is completely covered with points similar to the few shown in FIGURE 2 so that a continuous change in experienced in the intensity of the light reaching the larger upper end 14 of rod 10 as the liquid, e.g. water, level rises along the length of the rod. This change in light intensity can be correlated to the portion of the rod that is in contact with a liquid.

FIGURE 1 shows an assembly of components suitable for the level controller of this invention. The tapered rod 10 is shown attached to a housing 16 containing photocell 18 and light source 20, e.g. an incandescent light. A pressure seal (not shown) can be conveniently arranged at the rod for high pressure operations. Light source 20 has focusing lens 22 arranged thereat to focus as much light as possible at the end of rod 10 and thereby waste a minimum of light. Since the light source is not a point source but has a finite dimension, light rays of numerous angles, and consequently differing angles of incidence, are provided by the source. Such a light source will inevitably emit light rays that leave rod 10 at various points along its outer surface even at the glass-air interface. These rays are, however, of no interest in this description and do not affect the operation of the device. Light source 20 is operated by a regulated power supply 24 and photocell 18 is connected in a detector circuit 26 of conventional construction to produce an output representative of the intensity of the light reaching photocell 18.

In use the device of this invention is first calibrated, that is, the variations in light intensity experienced as the liquid level rises along the control area of the rod is plotted against the actual level on the rod for the particular fluid being sensed. Calibrations for several fluids can be made so that the device is quickly adaptable to use with these several fluids. Each calibration is, however, suitable for all fluids having a critical angle substantially equal to that of the fluid calibrated. With such calibration the output signal of detector 26 can be used, for example, to control an inlet or outlet valve or can be connected to a display instrument or meter to provide a visual indication of level.

Rod 10 can be composed of any suitable translucent or transparent material which has substantially total internal reflection characteristics in gas and relatively poor internal reflection characteristics when the lateral surface, at least in the tapered control area, is contacted with a liquid, e.g. the liquid to be sensed, such as glass, quartz, synthetic resins and the like, and such material may be colored or colorless. In general, clean, colorless, transparent rods are preferred and the rods are preferably composed of glass since it is generally non-reactive. Rods made of synthetic resins, especially resins which are made from vinyl type compounds, such as polymerized esters of acrylic acid, polymerized methacrylic acid esters, polymerized vinyl esters, polystyrene, etc. or copolymers of these esters including products known as Plexiglas, Lucite, etc., are also suitable. Rods made of these resins are easily machined to provide the desired taper. The preparation of these resins such as the methacrylic esters which produce hard polymers, e.g., methyl, ethyl, propyl, isopropyl, butyl, secondary and tertiary butyl methacrylates and copolymers of the methacrylic esters with other polymerizable compounds such as the acrylic and methacrylic esters, nitriles, etc., and monovinyl compounds such as vinyl acetate is well known. Of these polymers, polymerized methyl methacrylate is outstanding in its extreme clarity and transparency to light.

The dimensions of the rod can vary widely within the requirement that the rod be tapered so as to apply a decreasing angle of incidence to the light rays passing therethrough. In general, the angle of taper will depend upon the diameter and length of the rod. The larger the diameter, the larger the angle of taper and the longer the rod, the smaller the angle of taper. The angle of taper and the angle of incidence of the light rays passing through the rod are correlated so that the number of light rays passed through the rod having an angle of incidence $a$ less than the critical angle $a_c$ for the rod-fluid being sensed interface varies over the length of the tapered control area, i.e. the internal reflection characteristics on the rod vary to provide a detectable variation in intensity of the light received at the detector due to the resultant variation in the number of rays leaving the rod as liquid rises along the rod. Rods having a control area length of several inches to a foot, or more, e.g. 3 to 12, or more, inches and an angle of taper of about 1° to 5°, preferably 2° to 4°, are suitable. Suitable diameters for the rod include for the larger end of the rod diameters of about one-half to one or two, or more, inches and for the smaller end of the rod diameters of about 0.1 to ½ inch, or more. The reflective surface can be a silvered surface similar to that on the backs of mirrors.

To further illustrate the invention glass rods (RI=1.50) having control areas of the dimensions set forth in the following table accurately continuously measure liquid levels for water, acetone and carbon tetrachloride.

TABLE

|  | Rod 1 | Rod 2 |
| --- | --- | --- |
| Length control area (in.) | 5.0 | 7.0 |
| Upper diameter rod | 0.75 | 0.75 |
| Lower diameter rod | 0.16 | 0.26 |
| Total length rod | 9.25 | 8.0 |

It is claimed:
1. A liquid level detector comprising light source means; a light conductive rod of transparent material including an elongated frustoconical control portion having a smaller end and having a larger end mounted adjacent said light source means for transmission of light from the larger end toward the smaller end, the smaller end having an internally reflective surface for reflecting internal light within the rod and being adapted to be immersed in a liquid to be measured, said rod having substantially total internal reflection characteristics in gas and at least said control portion having relatively poor reflection characteristics when contacted by the liquid, said internally reflective surface having substantially total internal reflective characteristics, the angle of incidence of the light rays at the surface of the rod decreasing as the light rays pass through the rod toward the reflective surface, the angle of the taper of said rod being effective to vary over the length of the control portion the proportion of the light rays passing through the rod having an angle of incidence at the lateral surface of the tapered portion less than the critical angle for the rod-liquid interface, thereby varying the internal reflection characteristics of the control portion and consequently the intensity of the light returned to the larger end; and light detecting means at said larger end for detecting variations in the intensity of the light received at the larger end after being transmitted through the rod from the light transmitting means toward the smaller end and back toward the larger end.

2. The detector of claim 1 wherein the angle of taper for the control portion is about 1° to 5°.

3. The detector of claim 1 wherein the rod is glass.

4. The detector of claim 1 wherein the rod is glass and the angle of taper for the control portion is about 1° to 5°.

5. The detector of claim 1 wherein the angle of taper for the control portion is about 2° to 4°.

References Cited

UNITED STATES PATENTS

| | | | |
|---|---|---|---|
| 1,883,971 | 10/1932 | Kryzanowsky | 73—327 |
| 2,620,660 | 12/1952 | Goldsmith | 73—293 |
| 2,704,454 | 3/1955 | Martin | 73—327 |
| 3,054,291 | 9/1962 | Landwer | 73—293 |
| 3,367,184 | 2/1968 | McHugh | 73—327 |

FOREIGN PATENTS

| | | |
|---|---|---|
| 412,803 | 7/1934 | Great Britain. |

OTHER REFERENCES

Publication: "Liquid Level Alarm Using Internally Reflected Light," by W. E. Hood et al., Journal of Scientific Instruments, vol. 37, December 1960, p. 484.

LOUIS R. PRINCE, *Primary Examiner.*

D. M. YASICH, *Assistant Examiner.*